Apr. 3, 1923.　　　　　J. A. BEDINGFIELD　　　　　1,450,787
　　　　　　　　　　AUTOMOBILE TIRE RIM
　　　　　　　　　Filed June 1, 1922　　　　2 sheets-sheet 1
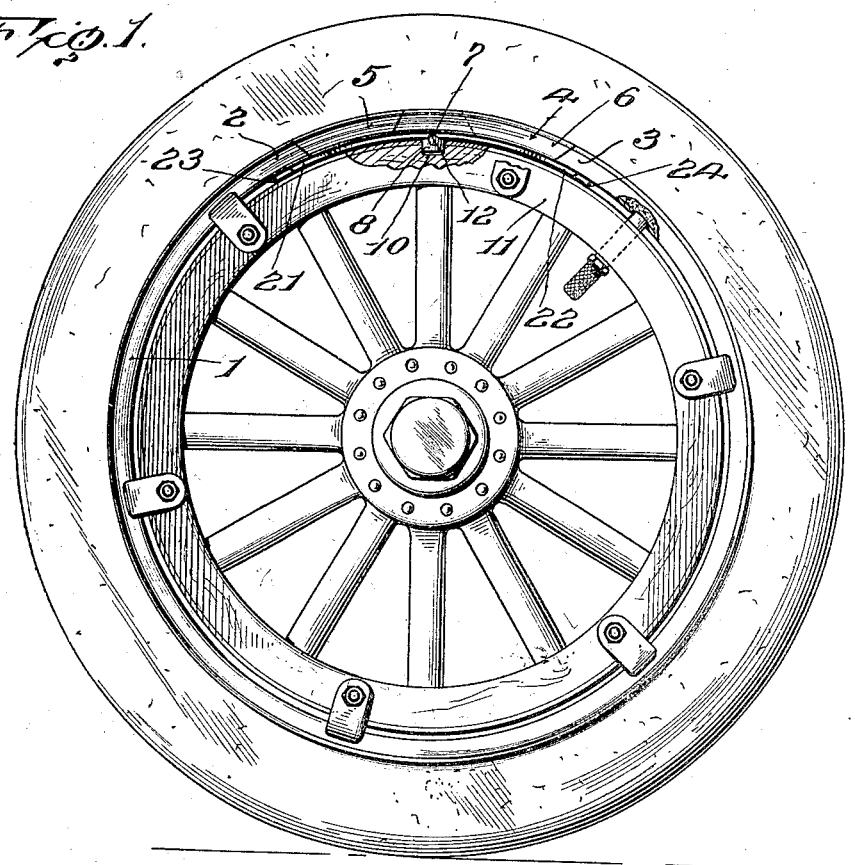
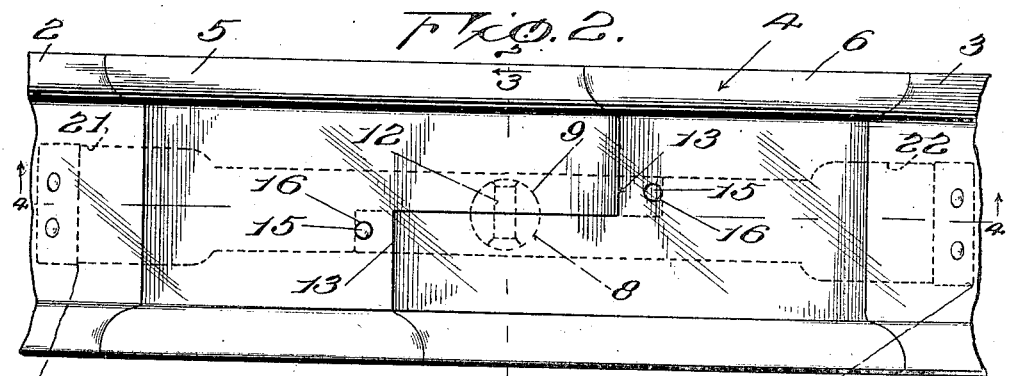
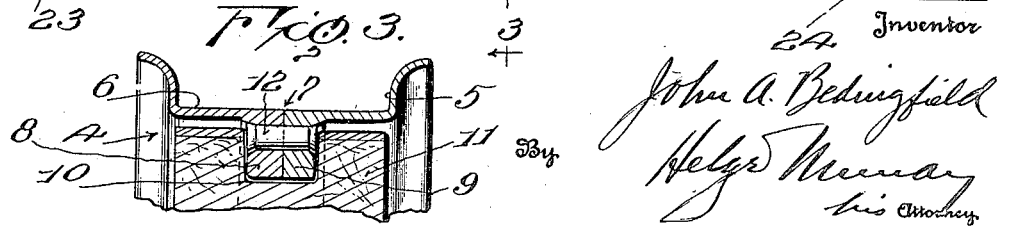

Apr. 3, 1923.
J. A. BEDINGFIELD
AUTOMOBILE TIRE RIM
Filed June 1, 1922
1,450,787
2 sheets-sheet 2
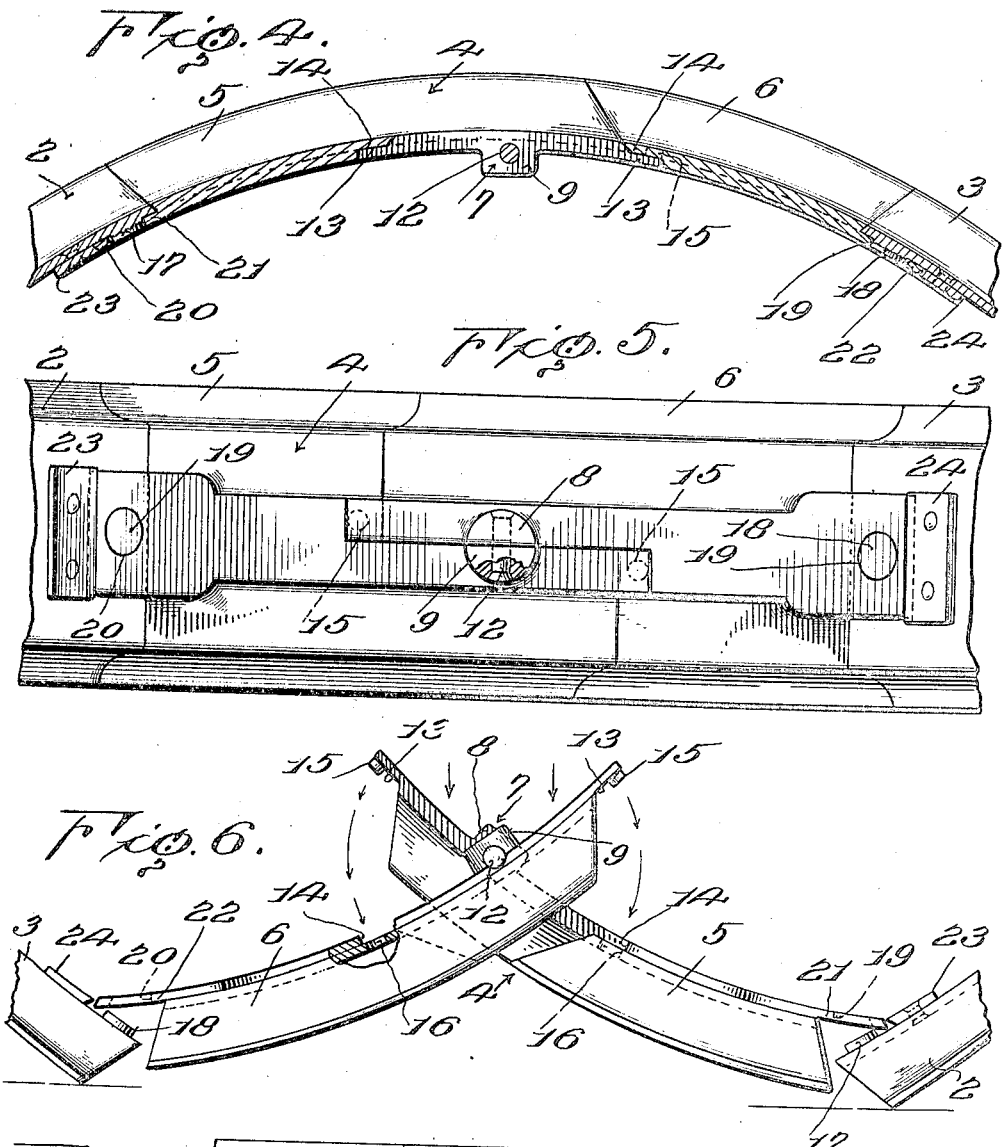
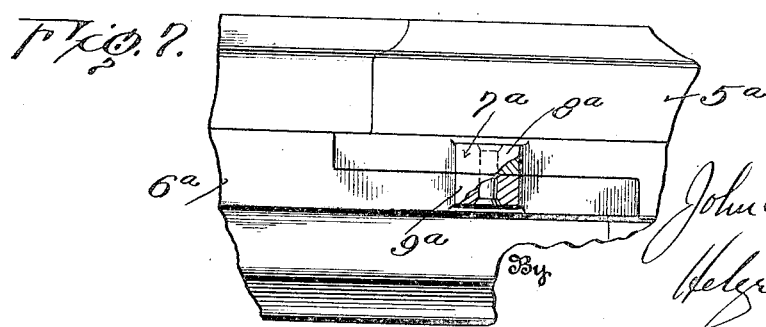

Patented Apr. 3, 1923.

1,450,787

UNITED STATES PATENT OFFICE.

JOHN A. BEDINGFIELD, OF FORT VALLEY, GEORGIA.

AUTOMOBILE TIRE RIM.

Application filed June 1, 1922. Serial No. 565,115.

*To all whom it may concern:*

Be it known that I, JOHN A. BEDINGFIELD, a citizen of the United States, residing at Fort Valley, in the county of Houston and State of Georgia, have invented certain new and useful Improvements in Automobile Tire Rims, of which the following is a specification.

My invention relates to automobile rims.

An object of my present invention is to provide a rim comprising a relatively permanent or non-collapsible rim section, and a detachable rim section therefor, said detachable rim section being formed of rim sections hinged together to afford a smooth and uninterrupted support for the tire, the hinge connection of the detachable rim section forming a driving lug adapted to fit an opening in the felloe.

Another object of the invention is the provision of an automobile rim including in combination a rim section having an open portion or gap therein and a detachable rim section positioned within the open portion for completing the rim, said detachable section being composed of relatively short rim sections hinged together at their inner ends and having complementary projections adapted to form a single centrally located stud or pin constituting the driving lug engaging the felloe.

A further object of the invention is to provide a rim section having an open portion or gap therein, a detachable toggle section consisting of rim sections connected by a hinge joint at their inner ends, means for locking said detachable rim section in the open portion of the rim for completing the rim, means for interlocking each inner end of each rim section to an adjacent rim section, and cooperating members arranged adjacent said hinge, said members being adapted when the detachable rim section is expanded in position to coact centrally and longitudinally with each other to form a single projection spaced from the side flanges of the rim and arranged to fit the usual opening now provided in the felloe for receiving the driving lug.

A still further object of the invention is to provide a rim section having an open portion or gap therein, a detachable rim section formed of short rim members having their extreme inner ends arranged in staggered and overlapping relation to form substantially a uniform thickness of rim, a hinge joint located near the inner ends of said short rim members and between staggered abutted inner ends, means for interlocking said overlapped end portions, and means projecting from said hinge joint and located intermediate opposite ends of said interlocking means, said projecting means coacting when the detachable rim section is expanded to form a driving lug readily fitted within the usual opening in the felloe.

With these and other objects in view my invention further consists in the construction and arrangement of the associated parts hereinafter described and pointed out in the claims.

In the drawings chosen for purposes of illustrating an embodiment of my invention and in which corresponding reference characters designate similar parts in the several views:

Figure 1 is a side view partly in section of a wheel showing my improved detachable rim section and hinge joint engaged with the felloe of a wheel.

Figure 2 is an enlarged top plan view of a portion of the rim and detachable rim section shown in expanded position.

Figure 3 is a detail transverse sectional view on the line 3—3 of Figure 2.

Figure 4 is a fragmentary and enlarged vertical central sectional view through the detachable rim section and joint with the parts in expanded position.

Figure 5 is a bottom plan view of the detachable rim section showing the staggered form of joint and cooperating projections provided on each short rim section, arranged to form the single centrally located circular pin or stud.

Figure 6 is a view in side elevation showing the detachable rim section in retracted or broken position with relation to the ends of the non-collapsible or permanent rim sections.

Figure 7 is a fragmentary plan view of the inner hinged ends of the rim sections forming the detachable rim section showing a modified construction of hinged projecting members coacting to form a square driving lug.

The present invention has been designed to provide a combined hinge joint and centrally located and relatively small driving lug easily formed by the projections through which pass the pivotal pin of the joint. Locking means for maintaining the hinged members in position is also provided, said means being arranged upon each side of the hinge joint for reducing the strain upon said joint to a minimum.

Referring to the drawings the relatively permanent or non-collapsible rim section 1 is formed with an open segmental portion or gap between the ends 2 and 3 thereof for the reception of the collapsible and detachable rim section 4.

The detachable rim section 4 is formed of rim sections 5 and 6 connected at their inner ends by means of a hinge connection 7, said hinge connection including adjacent cooperating projections 8 and 9 carried respectively by the rim sections 5 and 6 and arranged to meet in a central longitudinal or circumferential plane when the detachable rim section is expanded in position to complete the rim, thereby providing a single projection in the form of a stud or lug adapted to fit the opening indicated at 10 in the felloe 11 of the wheel. The cooperating projections 8 and 9 are relatively small each being formed of a semi-circular portion in the preferred embodiment of the invention. A pivot pin 12 passes through registering openings in the respective projections, opposite ends of said pin being riveted over in countersunk portions, as clearly shown in Figure 3. It will be understood that other means of retaining the pivot pin may be provided other than that shown and described herein. The pin 12 is located beneath the tire supporting surface of the rim sections and is preferably arranged relatively close to the under face of said rim sections.

The hinge connection is located back of the extreme inner ends of the rim sections of the detachable rim member and a staggered joint is formed by the abutting ends of said sections. Contiguous longitudinal and transverse joints are provided, the latter extending into the side flanges of the rim and forming the angular joints, as shown. The beads of the tire are supported upon the base of the rim adjacent the side flanges over the staggered joint and the strains of the joint are distributed at points obliquely located as distinguished from points in the tire immediately opposite.

The extreme inner ends of the rim sections 5 and 6 are cut away as at 13, said cut away portions being designed to coact with mating cut out portions 14 provided on adjacent portions of the rim sections. A pin 15 is carried by the inner end of each section and is adapted to fit within an opening 16 formed in the cooperating cut away portion of an adjacent rim section. The pin and opening connections forming the locking means for the inner ends of the rim sections are located radially with relation to the pivotal connection 7, whereby the pins 15 fit within the openings 16 and positively lock the rim sections against movement and prevent any tendency of said sections to rattle. By this construction the strain upon the pivot pin is reduced to a minimum and the size of the pivotal connection can be made correspondingly small and equally effective.

To further lock the rim sections 5 and 6 in place I provide studs or projecting pins 17 and 18 carried by the ends 2 and 3 of the rim 1, said pin being arranged for interlocking coaction with openings 19 and 20 formed in the projecting ends 21 and 22 of the rim sections 5 and 6. The extreme ends 21 and 22 are arranged to abut against the respective lugs 23 and 24 provided on the ends 2 and 3 of the rim section 1. Figure 4 shows the interlocked position of the foregoing described parts, the hinge connection and adjacent driving lug being located between the abutting staggered overlapping ends of the rim sections 5 and 6. In Figure 6 the parts of the detachable section are unlocked and the section shown in retracted or broken position about to be removed from the rim or inserted therein as the case may be and as will be understood.

In Figure 7 I have shown a slightly modified form of hinge joint 7ª in which the projections 8ª and 9ª are of rectangular formation, each projection, however, being carried by the adjacent inner end of the rim sections 5ª and 6ª and adapted to coact as in the preferred form. An opening of square formation may be provided in the felloe to receive the single lug formed by the coacting projections when the detachable rim section is expanded in position. It will be understood that various other shapes of lugs may be formed by cooperating projections of the hinge joint and I do not limit myself to the exact form shown herein.

I claim:—

1. A tire supporting rim comprising a section having an open portion or gap therein, a detachable rim section composed of relatively short sections having their free ends extending into and secured within said open portion for completing the rim, and a hinge joint connecting said short sections, said joint including complementary projecting portions adapted to coact longitudinally of the rim to form a driving pin adapted to engage the felloe of a wheel.

2. A tire supporting rim comprising a section having an open portion or gap therein, a detachable rim section composed of relatively short sections having their free ends extending into and secured within said open portion for completing the rim, and means for hinging the inner ends of said short sections together, said means forming a driving lug and comprising cooperating projections provided on said short sections adapted to form a substantially circular pin.

3. A tire supporting rim comprising a section having an open portion or gap therein, a detachable rim section composed of relatively short sections having their free ends extending into and secured within said open portion for completing the rim, and means for hinging said short sections together, said means forming a centrally located driving lug when the detachable section is expanded and formed of longitudinal adjacent projections arranged respectively on each short section for engaging the felloe of a wheel.

4. A tire supporting rim comprising a section having an open portion or gap therein, a detachable rim section composed of rim sections having their free ends extending into and secured within said open portion for completing the rim, a hinge joint for connecting said rim sections together with their inner ends abutting longitudinally and transversely of the rim, and cooperating curved projections provided on said rim sections and arranged adjacent said longitudinal portion of the joint and intermediate said transverse portions of said joint, said cooperating curved projections being adapted to form a single driving lug for engagement with the felloe of a wheel.

5. A tire supporting rim comprising a section having an open portion or gap therein, a detachable rim section composed of rim sections having their free ends extending into and secured within said open portion for completing the rim, a hinge joint connecting said rim sections, means interlocking the abutting inner ends of said rim sections when expanded into position for completing the rim, and coacting means associated with said hinge joint and located intermediate the said interlocking means, said coacting means forming a driving lug adapted to engage the felloe of a wheel.

6. A tire supporting rim comprising a section having an open portion or gap therein, a detachable rim section composed of rim sections having their free ends extending into and secured within said open portion for completing the rim, a hinge joint connecting said rim sections, projections on said hinge joint having adjacent faces meeting on the central longitudinal or circumferential plane of said rim to form a driving lug when the detachable rim section is expanded in position, and means for locking the inner abutting ends of said rim sections upon each side of said projections.

7. A tire supporting rim comprising a section having an open portion or gap therein, a detachable rim section composed of rim sections having their free ends extending into and secured within said open portion for completing the rim, coacting projections adapted to provide a driving lug, a pin connecting said projections and arranged to form a hinge for said rim sections, and means for locking the inner ends of said rim sections against movement when the detachable rim section is expanded in position.

8. A tire supporting rim comprising a section having an open portion or gap therein, a detachable rim section composed of rim sections having their free ends extending into and secured within said open portion for comprising the rim, a hinge joint connecting said rim sections, reduced end portions provided on the inner ends of said rim sections, said reduced end portions being arranged to overlap mating portions on an adjacent rim section, means for interlocking the inner ends of said rim sections against relative movement with respect to the first named section, and means associated with each of said rim sections and located centrally of the rim and adjacent said interlocking means for forming a driving lug adapted to engage an opening in the felloe of a wheel.

In testimony whereof I affix my signature.

JOHN A. BEDINGFIELD.